United States Patent [19]

Lee

[11] Patent Number: 4,849,202

[45] Date of Patent: * Jul. 18, 1989

[54] SULFUR RECOVERY PROCESS USING METAL OXIDE ABSORBENT WITH REDUCING GAS PURGE

[75] Inventor: Min-Hsiun Lee, Tulsa, Okla.

[73] Assignee: Amoco Corporation, Chicago, Ill.

[*] Notice: The portion of the term of this patent subsequent to Aug. 6, 2002 has been disclaimed.

[21] Appl. No.: 125,786

[22] Filed: Jul. 27, 1987

Related U.S. Application Data

[63] Continuation of Ser. No. 893,128, Aug. 4, 1986, abandoned.

[51] Int. Cl.⁴ .................... B01D 53/36; C01B 17/04
[52] U.S. Cl. .................... 423/574 R; 423/230; 502/34; 502/53; 502/517
[58] Field of Search .................... 423/230, 574 R, 622; 502/34, 53, 517

[56] References Cited

U.S. PATENT DOCUMENTS

| | | | |
|---|---|---|---|
| 2,416,044 | 2/1947 | Calbeck | 423/622 |
| 4,035,474 | 7/1977 | Kunkel et al. | 423/574 R |
| 4,044,114 | 8/1977 | Dezael et al. | 423/574 R |
| 4,088,736 | 5/1978 | Courty et al. | 423/230 |
| 4,363,790 | 12/1982 | Anderson et al. | 423/230 |
| 4,426,369 | 1/1984 | Palm | 423/574 R |
| 4,430,317 | 2/1984 | Reed et al. | 423/574 R |
| 4,473,541 | 9/1984 | Palm | 423/574 R |
| 4,482,532 | 11/1984 | Cabanaw | 423/574 R |
| 4,483,844 | 11/1984 | Cabanaw | 423/574 R |
| 4,507,275 | 3/1985 | Reed | 423/574 R |
| 4,508,698 | 4/1985 | Reed | 423/574 R |
| 4,533,529 | 8/1985 | Lee | 423/230 |

FOREIGN PATENT DOCUMENTS 159730 10/1985 European Pat. Off. ............ 423/230

Primary Examiner—John Doll
Assistant Examiner—Jeffrey Edwin Russel
Attorney, Agent, or Firm—L. Wayne White; Fred E. Hook; Gary M. Bond

[57] ABSTRACT

Sulfur species are removed from a Claus plant tailgas stream by contacting with ZnO producing ZnS which is regenerated to ZnO by dilute $O_2$. Following regeneration, freshly regenerated ZnO is purged with an effective reducing gas stream.

12 Claims, 4 Drawing Sheets

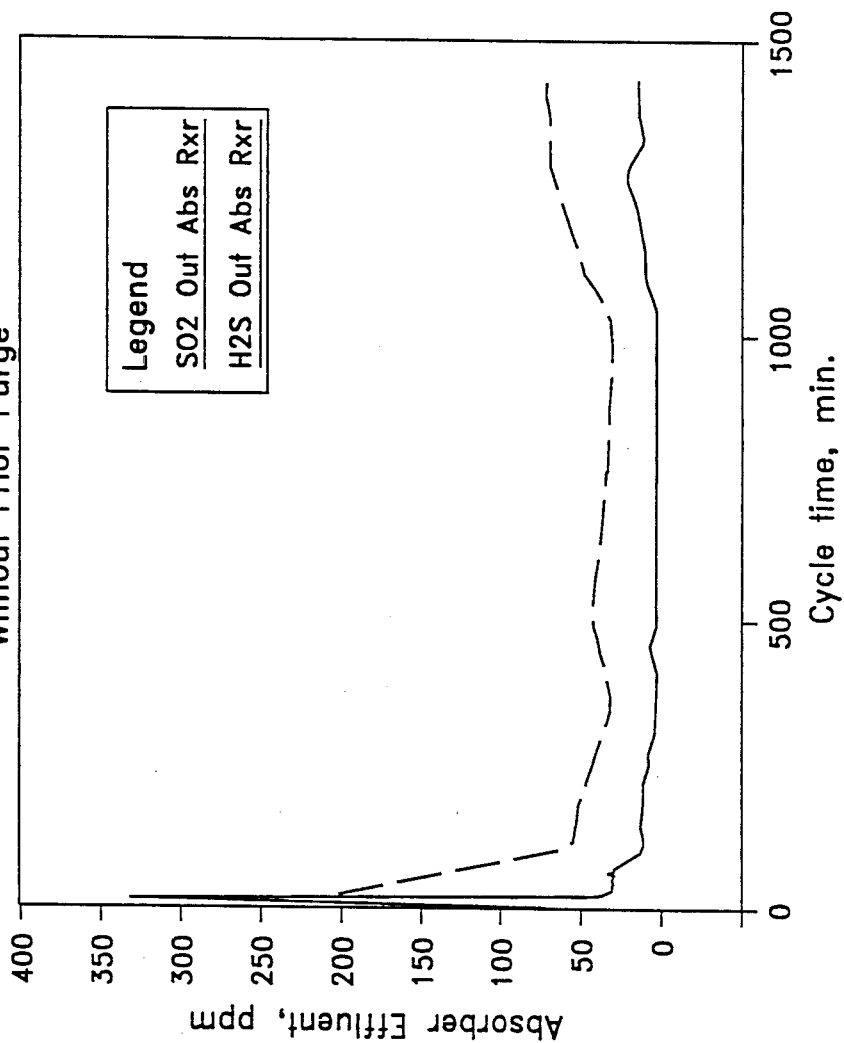

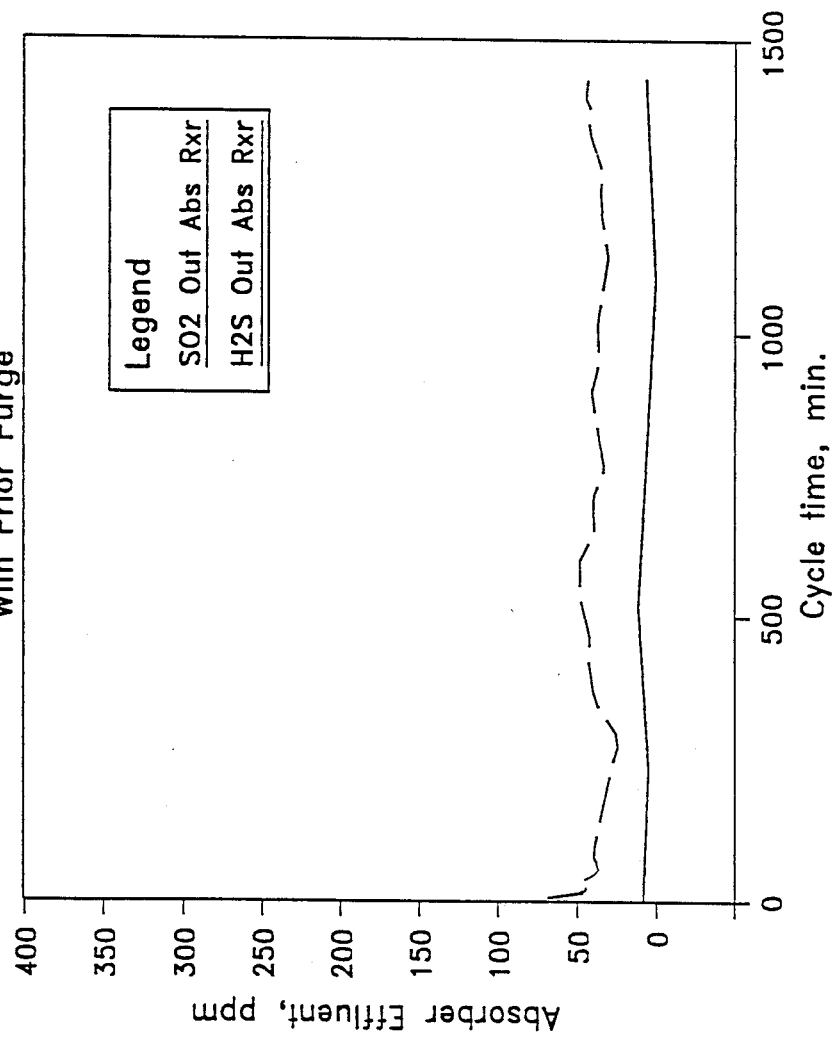

SULFUR RECOVERY PROCESS USING METAL OXIDE ABSORBENT WITH REDUCING GAS PURGE

This is a continuation of co-pending application Ser. No. 893,128 filed Aug. 4, 1986, now abandoned.

FIELD OF THE INVENTION

The invention relates to the removal of sulfur and sulfur compounds from gaseous streams containing such compounds. In one aspect, the invention relates to the removal of sulfur compounds including $H_2S$ (hydrogen sulfide) and $SO_2$ (sulfur dioxide) from Claus plant tailgas. In another aspect, the invention relates to the use of solid high surface area contact materials (absorbents), for example, ZnO-based (zinc oxide-based) absorbents, for absorbing sulfur compounds such as $SO_2$ and $H_2S$. In a further aspect, the invention relates to treating freshly regenerated ZnO absorbent with a reducing gas stream.

SETTING OF THE INVENTION

A developing area of sulfur recovery technology is that of tailgas cleanup, that is, of removing trace quantities of sulfur compounds from gaseous effluent streams (tailgas) of Claus process sulfur recovery plants. Tailgas may contain substantial amounts of sulfur compounds. Tailgas from Claus or extended Claus plants (having at least one Claus low temperature adsorption reactor) typically can contain about 0.5-10% of the sulfur present in feed to the plant as elemental sulfur, $H_2S$, $SO_2$, COS (carbonyl sulfide), $CS_2$ (carbon disulfide), and the like. Tailgas cleanup processes remove at least part of such residual sulfur compounds from Claus tailgas.

In prior U.S. Pat. No. 4,533,529, Claus tailgas is contacted with ZnO (zinc oxide) in an absorber reducing average overall emission levels from the absorber to less than 250 ppm sulfur species. It is desirable, however, and necessitated by certain environmental requirements, that not only average but instantaneous emissions be continuously maintained at a very low level.

It has been discovered, after ZnS (zinc sulfide) is regenerated to ZnO, that an increase in $SO_2$ emissions occurs from the absorber upon returning regenerated ZnO to absorption. These $SO_2$ emissions interfere with continuously maintaining instantaneous emissions at a very low level.

Accordingly, there is provided a process capable of diminishing such an increase in $SO_2$ emissions and maintaining effluent from the absorber at a continuous low level of emissions.

SUMMARY OF THE INVENTION

The invention comprises a process for continuously removing sulfur compounds, for example, $H_2S$ and $SO_2$, from a Claus plant gaseous effluent stream to an extremely low level. In this process, the sulfur compounds are removed in the presence of a absorbent based on ZnO as active absorbent (herein referred to as ZnO or ZnO-based absorbent) to produce a laden, sulfided absorbent (ZnS) and a purified gaseous stream (absorber effluent) continuously having on the order of 250 ppm or less total residual $H_2S$ and $SO_2$.

The process for the recovery of sulfur from a $H_2S$ containing gaseous stream comprises converting $H_2S$ to elemental sulfur by the Claus reaction in a Claus plant comprising a Claus thermal reaction zone (furnace) and at least one Claus catalytic reaction zone and producing a tailgas comprising significant amounts of both $H_2S$ and $SO_2$. As used herein, significant amounts of $H_2S$ and $SO_2$ means that each is present in excess of 250 ppm. The tailgas can then be treated to remove both $H_2S$ and $SO_2$ by reaction with ZnO in a first absorption zone containing ZnO (functioning as an absorber) in the presence of reducing species for converting substantially all sulfur species in the tailgas to $H_2S$, producing ZnS and absorber effluent. Optionally, the $SO_2$ and other sulfur species which are not $H_2S$ can be converted to $H_2S$ prior to the first absorption zone. The resulting ZnS can be regenerated, that is, returned to the active ZnO form of the absorbent, by introducing $O_2$ (molecular oxygen) into a second absorbtion zone (functioning as a regenerator) and regenerating the zinc sulfide to ZnO, producing regeneration effluent. Regeneration effluent comprising $SO_2$ is returned to the Claus plant. Following regeneration of absorbent in the second absorber zone, the introduction of $O_2$ into the second absorber zone is discontinued and an effective reducing gas is passed through the second absorption zone during a purge period. Then, the first absorption zone (absorber) and the second absorption zone (regenerator) can be interchanged and the process can be repeated and continued with the first absorption zone now functioning as a regenerator and the second absorption zone now functioning as an absorber. The process is additionally characterized by the fact that the purge period lasts for a period of time effective for diminishing by at least 10% an increase in $SO_2$ emissions from an absorber at the start of absorption following interchanging of the absorber and the regenerator where purge with an effective reducing gas stream is not utilized.

The invention accordingly comprises the processes and systems, together with their steps, parts, and inter-relationships which are exemplified in the present disclosure, and the scope of which will be indicated in the appended claims.

BRIEF DESCRIPTION OF THE DRAWINGS

FIG. 3 shows graphically an increase in $SO_2$ emissions occurring where freshly regenerated absorbent is not purged before absorption with an effective reducing gas.

FIG. 4 shows graphically that such an increase in $SO_2$ emissions as shown in FIG. 1 can be eliminated by purging before absorption with an effective reducing gas.

DETAILED DESCRIPTION OF THE INVENTION

Figure 1:
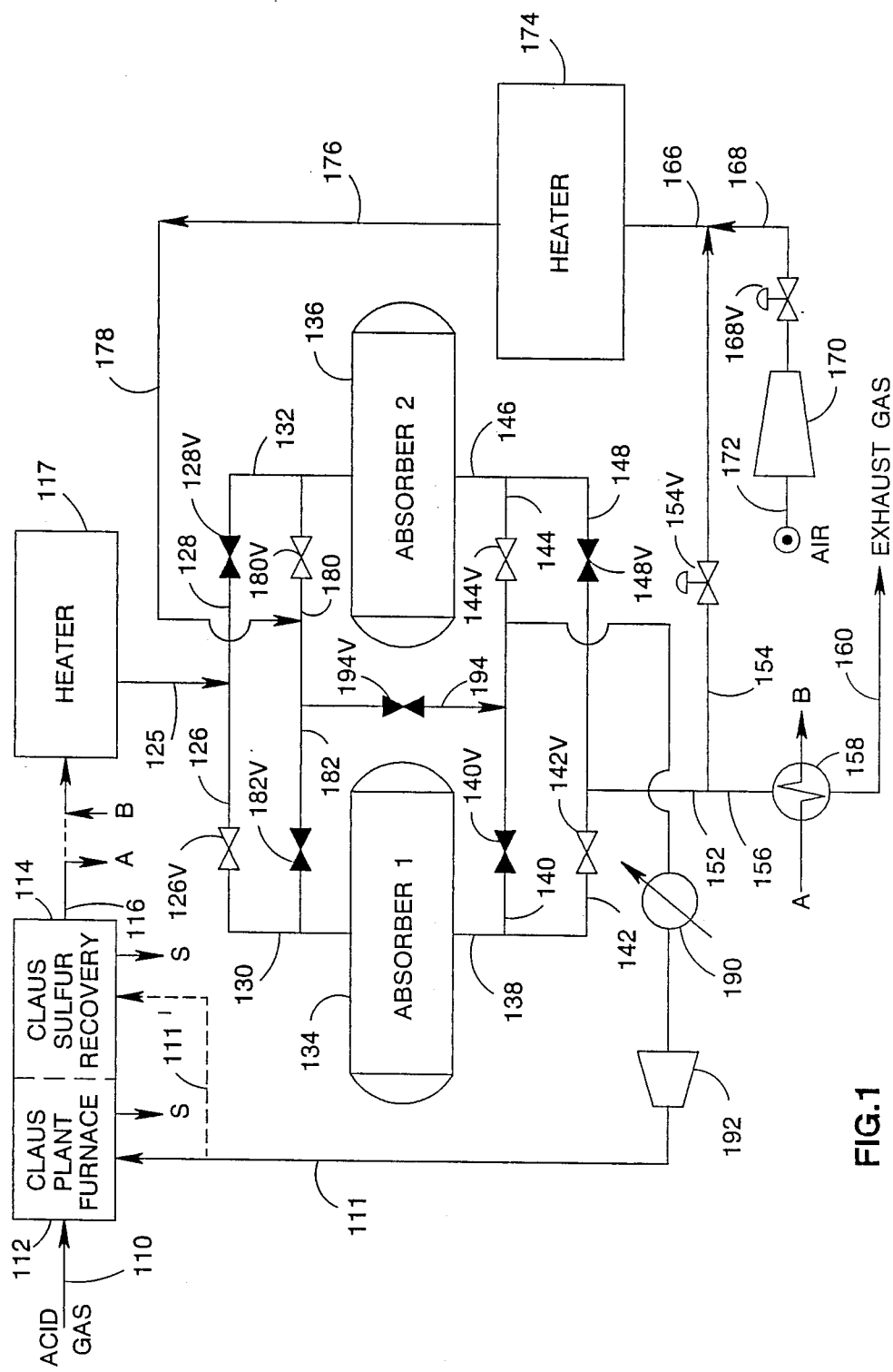
FIG. 1 shows schematically a first embodiment of the invented process.

Sulfur is recovered from an $H_2S$-containing stream by introducing the stream into a Claus plant comprising a thermal reaction zone (Claus furnace) and at least one Claus catalytic reaction zone. The Claus thermal reaction zone can be, for example, a Claus muffle tube furnace, a fire tube furnace, or the like. Generally, the Claus thermal reaction zone functions for converting a portion of $H_2S$, preferably about ⅓, to $SO_2$ for thermal or catalytic Claus reaction with $H_2S$ to form elemental sulfur.

In the Claus furnace, the $H_2S$-containing gas and oxidant can be reacted at a temperature generally in the range of about 1800°–2600° F. The effluent from the Claus thermal reaction zone can be cooled, for example, in a waste heat boiler, and optionally passed through a sulfur condenser to condense and remove liquid sulfur.

The gaseous effluent can then be fed into a Claus catalytic reaction zone operated above the sulfur dewpoint having an inlet temperature in the range, for example, of about 350°–650° F. In the Claus high temperature catalytic reactor, sulfur is formed by the Claus reaction (shown below) in the presence of an effective Claus reaction-promoting catalyst such as alumina or bauxite:

$$2 H_2S + SO_2 \rightarrow 3S + 2 H_2O$$

Gas containing elemental sulfur vapor can be continuously removed from the reactor and provided to a sulfur condenser where sulfur is condensed and removed as a liquid. Gaseous effluent from the sulfur condenser can be reheated, if desired, and passed to further high temperature Claus reactors and associated sulfur condensers as is known in the art. The effluent gas from the final sulfur condenser is then the Claus plant tailgas. Where a Claus low-temperature adsorption zone is used, it may or may not be followed by a sulfur condenser. Thus, adsorber effluent may be the Claus plant tailgas.

Preferably, the Claus plant tailgas is from a Claus plant which includes at least one Claus catalytic reactor operated under conditions, including temperature, effective for depositing a preponderance of the formed sulfur on Claus catalyst therein. Such a Claus low temperature adsorption zone can be broadly operated in the range of from about 160° to about 330° F., preferably in the range of from about 260°–320° F.

The operation of such Claus plants having Claus furnaces, Claus high temperature reactors, and Claus low temperature adsorption reactors is well known in the art and need not be further described here. See, for example, U.S. Pat. Nos. 4,044,114; 4,426,369; 4,430,317; 4,473,541; 4,482,532; 4,483,844; 4,507,275; 4,508,698, and numerous others.

The tailgas from such Claus plants comprises $H_2S$, $SO_2$, organic sulfides, and reducing species such as $H_2$ and CO. Tailgas from plants having only Claus high temperature reactors can contain $H_2S$ in the range of about 0.4 to about 4 mol%, $SO_2$ in the range of about 0.2 to about 2 mol%, water in the range of about 20 to about 50 mol% (typically 30–40 mol %), as well as organic sulfides such as COS and $CS_2$, and elemental sulfur. Where the tailgas is from a plant having one or more Claus low temperature adsorption reactors, the tailgas may have equivalent of about 0.4 mol %, preferably about 0.2 mol %, or less single sulfur species.

Use of at least one Claus low-temperature adsorption reactor is preferable in part because such reactors remove significant amounts of organic sulfides, such as COS, $CS_2$, and the like from the gas in process. These organic sulfides are not removed by sulfur recovery processes such as the IFP Process described in DeZael, et al., U.S. Pat. No. 4,044,114 (1977) which forms elemental sulfur in the presence of polyethylene glycol and sodium benzoate. See, e.g., Kohl and Riesenfeld, Gas Purification, pages 491–493 (3d Ed. 1979).

For the same reason, it is also preferred to operate at least one Claus high temperature reactor so that effluent has a temperature in the range from about 550° to 700° F., preferably from about 600° to 650° F. to diminish the amount of organic sulfides in the effluent. See, e.g., Kunkel, et al., U.S. Pat. No. 4,035,474 (1977).

Both $H_2S$ and $SO_2$, as well as organic sulfides, can be concurrently removed in the absorber containing ZnO in the presence of reducing species for reducing the $SO_2$ and other sulfur species to $H_2S$. Alternatively, sulfur containing species other than $H_2S$ can be converted to $H_2S$ in a hydrogenation zone prior to introduction into the absorber. In either case, it is preferred to operate the Claus plant so that about a 2:1 ratio of $H_2S:SO_2$ is maintained in the Claus plant tailgas to maximize sulfur recovery in the Claus plant and to minimize the amount of sulfur remaining in the Claus plant tailgas to be removed by the ZnO absorbers. Such ratio can be maintained by control systems well known in the art and need not be further described here. By reducing the organic sulfide and other sulfur content in the feed to the ZnO absorbers, the volume of regeneration effluent returned to the Claus plant can be reduced or diminished. An effect of operating at about a 2:1 ratio, however, is that quantities of both $H_2S$ and $SO_2$ are present in the Claus plant tailgas, i.e., more than about 250 ppm of each of $H_2S$ and $SO_2$.

The reducing species, for example, $H_2$ and/or CO required for conversion of sulfur compounds in the tailgas to $H_2S$ can be obtained from any convenient source including that present in the tailgas as $H_2$, or available from a donor such as CO, which can react with water to yield $H_2$. $H_2$ is preferred, whether contained in the tailgas or internally generated or provided from an outside source.

The Claus plant tailgas can contain sufficient reducing species where the Claus plant is appropriately operated. For most Claus plants, by operating the Claus furnace so that slightly less air is utilized than that required for reaction (1)

$$H_2S + O_2 \rightarrow H_2O + \tfrac{1}{2} S + \tfrac{1}{2} SO_2 \qquad (1)$$

and by insuring that the tailgas leaving the final sulfur condenser of the Claus plant has a low level of residual elemental sulfur, the Claus plant tailgas will contain sufficient reducing species. By further reducing the amount of oxidant introduced into the Claus furnace or by other methods which will be apparent to persons skilled in the art, the amount of reducing species can be further increased if desired.

The Claus plant tailgas having sufficient reducing species to reduce all sulfur compounds therein to $H_2S$ can be heated, for example, directly by means of direct fired heaters, or indirectly by heat exchange, for example, with other process streams such as absorber effluent, to produce a heated Claus plant tailgas effluent stream having a temperature effective for removal of both $H_2S$ and $SO_2$ in the presence of a solid particulate preferably high surface area (for example, pellets, extrudates, and the like) ZnO absorbent effective for such removal. This simultaneous removal of both $H_2S$ and $SO_2$ is considered to proceed by hydrogenation of sulfur compounds present in the tailgas to $H_2S$ in the presence of ZnO, ZnO in this respect acting as a catalyst, followed by absorption of the thus-formed $H_2S$ by the ZnO by sulfiding the ZnO to ZnS, the ZnO acting as an absorbent. Preferably, the Claus plant tailgas can be heated to above about 1000° F. As illustrated in EXAMPLE I below, by operating at these absorber temperatures, a hydrogenation reactor is not required before removal of sulfur compounds other than $H_2S$ in the absorber. Conversely, temperatures below about 1000° F. can be used during absorption with the addition of a separate and distinct hydrogenation reactor or zone prior to the absorbers. When operating at temperatures above about 1000° F., H₂S emissions and the reduction of ZnO to Zn vapor under a reducing environment can set a practical upper limit on the absorption temperature which will be used. Currently for these reasons it may be appropriate that the upper limit during absorption be about 1200° F. Higher temperatures can also be used. Absorber operation above about 1000° F. is preferred because such higher temperatures favor higher absorption capacity and the hydrogenation reactor can be eliminated. Also, since absorption and regeneration will then be conducted at approximately the same inlet temperature (1000°–1200° F.), temperature stress on equipment can be reduced. As a result, there will be no significant heating and cooling periods. Hence, the time available for regeneration will be increased and the rate of regeneration effluent returned to the Claus plant can be decreased.

Where the Claus plant is introduced into a hydrogenation zone prior to the ZnO absorbers, the principal reaction will be the conversion of SO₂ to H₂S as shown by Reaction (6) below; other sulfur compounds including elemental sulfur, COS, CS₂, and the like will also be reduced to H₂S. Hydrogenation can be carried out at a temperature of from about 450° to about 1200° F. or even higher, preferably from about 580° F. to about 900° F., depending on the conditions and the source of H₂ chosen. Hydrogenation by contacting with a bed, either supported or fluidized, of effective hydrogenation catalyst is preferred. Useful catalysts are those containing metals of Groups VB, VIB, VIII and the Rare Earth series of the "Periodic Table of the Elements" in Perry and Chilton, *Chemical Engineers Handbook*, 5th Ed. The hydrogenation catalysts may be supported or unsupported. Catalysts supported on a refractory inorganic oxide, such as on a silica, alumina or silica-alumina base are preferred. The preferred catalysts are those containing one or more of the metals, cobalt, molybdenum, iron, chromium, vanadium, thorium, nickel, tungsten (W) and uranium (U) added as an oxide or sulfide of the metal, although the sulfide form appears to be the active form. Particularly preferred are cobalt-molybdenum hydrogenation catalysts such as are commercially available for use in the refining industry for desulfurization processes in the refining of oil.

After hydrogenation, the resulting stream now containing substantially all sulfur compounds in the form of H₂S can then be contacted in an absorber zone with a suitable ZnO absorbent (either fixed or fluidized bed) to absorb H₂S and to produce a laden (sulfided) absorbent at temperatures in the range of about 600° F. to about 1000° F. Alternatively, where absorption is conducted at a temperature above about 1000° F., for example, in the range of about 1000° F. to about 1200° F., the absorption of H₂S can be accomplished in an absorber simultaneously with removal of the other sulfur compounds without prior hydrogenation. In either event, while a first absorption zone is functioning as an absorber, a second absorption zone can be functioning as a regenerator.

As used herein, and in the claims, the terms "absorbent", "ZnO", "ZnO absorbent", and the like shall mean an absorbent effective for removal of both H₂S and SO₂ in the presence of reducing species. A major portion of the active absorbent, for example, fifty percent or more, is in the form of ZnO which is the active form. The absorbent can also contain binders, strengtheners, and support materials, for example, alumina (Al₂O₃), calcium oxide (CaO) and the like. Zinc sulfide and zinc sulfate can be used as starting materials and treated with heat and/or oxygen to produce an active ZnO sorbent. Other suitable starting materials can also be used. The ZnO absorbent is effective for absorbing H₂S by undergoing sulfidization to produce a laden (sulfided) absorbent; simultaneously, if desired, hydrogenation of other sulfur compounds to H₂S followed by such absorption can occur. Preferably, the ZnO absorbent is capable of a high level of removal of sulfur compounds and is relatively insensitive to water.

Particularly preferred are ZnO absorbents which are thermally stable, regenerable, and capable of absorbing substantial amounts of sulfur compounds. An acceptable absorbent is United Catalysts, Inc., G72D Sulfur Removal Catalyst, available from United Catalysts, Inc., Louisville, KY, having the following chemical composition and physical properties:

| CHEMICAL COMPOSITION | | | |
| --- | --- | --- | --- |
| | wt % | Trace Metal Impurities | wt % |
| ZnO | 90.0 ± 5% | Pb | <0.15 |
| Carbon | <0.20 | Sn | <0.005 |
| Sulfur | <0.15 | As | <0.005 |
| Chlorides | <0.02 | Hg | <0.005 |
| Al₂O₃ | 3–7 | Fe | <0.1 |
| CaO | 0.5–3.0 | Cd | <0.005 |
| PHYSICAL PROPERTIES | | | |
| Form | Pellets | | |
| Size | 3/16 in. | | |
| Bulk Density | 65 ± 5 lbs/ft3 | | |
| Surface Area | 35 m2/g minimum | | |
| Pore Volume | 0.25–0.35 cc/g | | |
| Crush Strength | 15 lbs minimum average | | |

Representative chemical reactions considered to occur during adsorption, regeneration and purging are shown below:

During Absorption:

$$H_2S + ZnO \rightarrow ZnS + H_2O \qquad (3)$$

$$COS + ZnO \rightarrow ZnS + CO_2 \qquad (4)$$

$$CS_2 + 2ZnO \rightarrow 2ZnS + CO_2 \qquad (5)$$

$$SO_2 + 3H_2 \rightarrow H_2S + 2H_2O \qquad (6)$$

$$H_2S + \text{Sulfated Absorbent} \rightarrow SO_2 + ZnO \text{ Absorbent} \qquad (7)$$

During absorption, H₂S, COS and CS₂ in the stream can react with ZnO to form ZnS as shown in Eqs. (3) to (5). SO₂ can react directly with H₂ to form H₂S as shown by Eq. (6), and the resulting H₂S can then react with ZnO. COS and CS₂ may also be hydrogenated and/or hydrolysed to H₂S before absorption by ZnO. When elements in the absorbent such as zinc, calcium, aluminum, or other elements become sulfated during regeneration, SO₂ may be produced during absorption as indicated by Eq. (7) due to the presence of effective reducing species in the absorber feed. Sulfation is reversed by purging the regenerated absorbent with effective reducing species before returning regenerated ZnO to absorption and returning the produced SO₂ to the Claus plant for sulfur formation and removal.

During Regeneration:

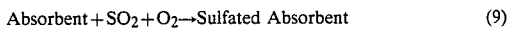

Regeneration of sulfided absorbent is effected by oxidizing ZnS to ZnO as shown by Eq. (8). Absorbent sulfation can also occur, as shown by Eq. (9) during regeneration in the presence of $O_2$ and $SO_2$. Temperature rise during regeneration can suffice if unchecked to destroy both the physical integrity and the chemical activity of the absorbent as well as to exceed metallurgical limits of preferred materials of construction. Consequently, temperature rise during regeneration is preferably controlled to less than about 1500° F.

During Purging:

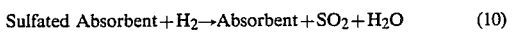

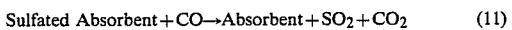

Reduction of the sulfated absorbent will occur at temperatures above about 1000° F. in the presence of $H_2$, CO or other reducing species such as $H_2S$. Reduction of the sulfated absorbent is not effected at lower temperatures such as 900° F. or lower or in the absence of such effective reducing species.

Methane is not effective in reasonable periods of time under process conditions for purging in accordance with the invention. Further, purging with an inert gas will not prevent the $SO_2$ emissions increase upon returning to absorption. Rather, upon switching to absorption, the sulfated ZnO absorbent will be contacted with a stream containing the effective reducing species ($H_2$, CO, and $H_2S$) and $SO_2$ emissions will occur. Accordingly, for the purging, it is essential that effective reducing species be present and that the temperature be greater than about 1000° F., but preferably not much greater than about 1200° F. since significant losses of zinc can occur above that temperature in the presence of reducing species. Nevertheless, higher temperatures can be used.

The absorber zone containing ZnO can comprise at least a first absorption zone (functioning as an absorber) and a second absorption zone (functioning as regenerator) and the process can comprise contacting $H_2S$ with absorbent in the absorber to remove it and other sulfur species producing a laden absorbent and absorber effluent lean in sulfur species. Absorption can be continued for a period of time (absorption period), preferably less than that required for $H_2S$ breakthrough from the absorber. For practical purposes, $H_2S$ breakthrough can be defined as occurring when the $H_2S$ concentration in the absorber effluent stream reaches a preset low value, such as for example, 50 ppm $H_2S$. As shown in EXAMPLE 1 and II below, breakthrough time and absorption capacity increase with increasing absorber temperature. Concurrently, with absorption in the absorber, laden absorbent in the regenerator can be regenerated by introducing a regeneration stream comprising dilute $O_2$ thereinto at a temperature effective for converting laden sulfided absorbent to active absorbent. Regeneration effluent comprising $SO_2$ is returned from the regenerator to the Claus plant, for example, to the thermal reaction zone or to a downstream Claus catalytic reaction zone. Thereafter, the absorber and the regenerator can be interchanged, with the second absorption zone now functioning as absorber and the first absorption zone now functioning as regenerator, and the process can be repeated and continued. Prior to interchanging the absorber and the regenerator, freshly regenerated absorbent in the regenerator is purged with an effective reducing gas.

During regeneration, a temperature rise of about 145° F. occurs for each mol percent of oxygen consumed in converting ZnS back to ZnO. To avoid exceeding metallurgical limits and to maintain absorbent physical and chemical integrity during regeneration, a maximum of about 3.5 mol % oxygen can be used during regeneration when the regeneration stream is introduced at about 1000° F., and a maximum of about 2.75 mol % $O_2$ when the regeneration stream is introduced at about 1100° F. Thus, preferably oxygen is introduced during regeneration at a concentration of about 0.4 or less to about 3.5 mol%, more preferably at about 1 to about 2.75 mol %. Due to the exothermic nature of the regeneration reaction, suitable methods for diluting the oxygen can be used. Where metallurgical limits are not controlling, the maximum temperature during regeneration can be as high as about 2100° F.

Prior to the discoveries set forth herein, suitable methods for diluting the oxygen would have been considered to include the following: (1) a portion of the regenerator effluent can be recycled back to the regenerator to dilute $O_2$ in the regeneration stream; (2) a portion of absorber effluent can be used to dilute $O_2$ in the regeneration stream.

When method (1) is employed, the $SO_2$ level during regeneration in the regenerator is higher than when method (2) is used since $SO_2$ produced during regeneration is recycled to the regenerator. Reference to EXAMPLE VI indicates that higher $SO_2$ levels during regeneration favors sulfation of the absorbent. It has also been found when method (1) is used that $SO_2$ emissions are larger upon returning to absorption, and/or that a longer purge time is required prior to returning to absorption to eliminate an increase in $SO_2$ emissions following return to absorption. Accordingly, method (2) is preferred for diluting the $O_2$ to a suitable concentration for regeneration.

The flow rate during regeneration is preferably a rate sufficient to complete regeneration and purging as described herein of a ZnO absorber during effective absorption in another ZnO absorber. In this way, only two absorption zones will be required. Some time can also be allowed for the contingency of process upsets (slack time). Preferably, the flow rate during regeneration is such that the period during which regeneration is occurring is equal to the period during which absorption is occurring less the period required for purging as herein set forth and such slack time.

As indicated, regeneration effluent comprising $SO_2$ is returned from the regenerator to the Claus plant for conversion of the $SO_2$ to elemental sulfur which is removed from the gas in process. Dilution of the $O_2$ using absorber effluent minimizes purge time and/or magnitude of the $SO_2$ emissions at the start of absorption but can result in a large volume of regeneration effluent being returned to the Claus plant. This has the undesired result of increasing the size of the Claus plant and equipment downstream of the locus where the regeneration effluent is reintroduced resulting in significant cost increases.

The rate of regenerator effluent returned to the Claus plant could be reduced by recycling regenerator effluent as diluent back to the regenerator. However, this results in larger $SO_2$ emissions at the start of absorption and/or longer purge time prior to absorption. Other methods which might be used to reduce the volume of regenerator effluent are also disadvantageous. As an example, $O_2$ concentration could be increased during regeneration resulting in a smaller volume of regeneration effluent. However, $O_2$ concentration in excess will cause temperature rise during regeneration to exceed metallurgical limits of convenient materials of construction and can result in damage to equipment or to the absorbent. As another example, more than two ZnO absorbers might be used, so that while one absorber is on absorption, two or more other absorbers could be in various stages of regeneration and purging. This, however, also increases cost.

Absorber effluent can be used for diluent and the rate of regeneration effluent returned to the Claus plant can still be reduced (1) where the Claus plant comprises at least one Claus low-temperature adsorption reactor, (2) where $O_2$ introduced during the regeneration period when ZnS is being converted to ZnO is in an amount about equal to the stoichiometric amount for such conversion, that is, about 3/2 moles $O_2$ for each mole of ZnS to be regenerated, and (3) where the rate of absorber effluent diluent introduced during the regeneration is such that the rate of regeneration effluent during the regeneration period is less than the rate of regeneration effluent returned in the absence of treating in a Claus low-temperature adsorption reactor prior to treatment in a ZnO-containing absorber. As absorber effluent typically comprises residual $H_2$ and CO, the amount of $O_2$ introduced can further include about the stoichiometric amount required for combusting $H_2$ and CO to water and $CO_2$.

By use of a low-temperature Claus adsorption reactor, the absorption rate for a ZnO absorber is decreased since the sulfur content of the feed to the absorber is reduced, allowing $O_2$ to be introduced to the regenerator at a lower rate. By introducing $O_2$ during the regeneration period in a total amount effective for oxidizing ZnS to ZnO and, as appropriate, also for combusting any residual $H_2$ and CO to $H_2O$ and $CO_2$, the total volume of $O_2$ is minimized. This permits the rate of absorber effluent introduced as diluent into the regenerator during regeneration to be such that the volume of regeneration effluent returned to the Claus plant during regeneration can be reduced in comparison with the volume where a Claus low-temperature adsorption reactor is not used. This result can be achieved by controlling the rate at which absorber effluent is introduced into the regenerator as diluent, so that the volume of regeneration effluent returned to the Claus plant is reduced in comparison with the volume where a Claus low-temperature adsorption reactor is not used while still maintaining, for example, the temperature in the regenerator at a desired level, i.e., below about 1500° F. Preferably, the absorber effluent is introduced into the reactor being regenerated at a rate less than about 35% of the absorber effluent rate leaving the first absorption zone. Such rates of less than 35% have been found to be effective to reduce the size of the Claus plants upstream of the ZnO absorbers as compared with Claus plants lacking Claus low temperature adsorption zones. More preferably, the absorber effluent is introduced as diluent into the regenerator at a rate less than about 20% of the absorber effluent rate to allow a large margin to compensate for process upsets, slack time following regeneration and purging, and the like and still reduce the volume of regeneration effluent recycled to the Claus plant. Most preferably, the absorber effluent is introduced into the regenerator at a rate less than about 10% of the absorber effluent rate since such absorber effluent diluent rates have been found to greatly reduce the volume of absorber effluent returned to the Claus plant when a Claus low temperature adsorption reactor is used in accordance with the invention.

Regeneration can be preferably continued until substantially all of the sulfided absorbent is regenerated, for example, until ZnS is substantially reconverted to ZnO. Completion of regeneration can be conveniently determined by monitoring $O_2$ or $SO_2$ content or temperature of the regenerator effluent stream. Preferably, an $O_2$ analyzer is employed downstream of the regenerator to determine the presence of $O_2$ in the regenerator effluent, which is an indication of completion of regeneration.

As will be appreciated by those skilled in the art from the foregoing discussion, materials of construction for the valves, vessels, and piping for the process according to the invention can require special attention. The material preferably has the capability of withstanding high temperatures, for example, in the range of about 800° F. to about 1500° F. or higher while being repeatedly exposed to reducing and oxidizing atmospheres in the presence of sulfur compounds.

Following regeneration, prior to returning the regenerated absorbent for use during the absorption cycle, the regenerated absorbent is treated (purged) by passing a reducing stream in contact with the regenerated, albeit sulfated absorbent (see Examples VI–VII), for a period of time effective for reducing by at least 10% a temporary increase in $SO_2$ emissions otherwise occurring when freshly regenerated ZnO absorbent is returned to absorption without such purging with a reducing gas. Preferably, the time is effective for reducing $SO_2$ emissions to below about 250 ppm at all times. Most preferably, the time is effective for substantially eliminating the increasing $SO_2$ emissions, that is, for reducing the increase in $SO_2$ emissions above the usual level during absorption by 90% or more from the level occurring where such a reducing gas purge is not used prior to returning to absorption.

The effective purge time can be readily determined by one skilled in the art by monitoring $SO_2$ emissions from an absorber following returning a freshly regenerated reactor to absorption function and increasing the purge time for a given reducing gas stream prior to returning to absorption until the $SO_2$ emissions are reduced to a desired level upon returning to absorption. In using the absorber effluent for purging, a purge time in the range of about ½ to about 3 hrs can be effective, preferably, in the range of about 1 to about 2 hrs. The stream used for purging can be any reducing stream containing reducing species such as $H_2$, CO or $H_2S$. Preferably $H_2$ or CO are used since these do not result in loading the absorbent during purging. The reducing species should preferably be present in an amount effective for reducing the sulfated absorbent in the purge period. For example, at a space velocity of 1 lb mol/hour/cu ft of absorbent, for a purge period of about ½ to about 3 hrs, the reducing species can be present in the range of about 6.5 to about 1/1 mol%; similarly, for a reducing period in the range of about 1 to about 2 hrs, the reducing species can be present in an amount of about 3.2 to 1.6 mol%. Other space velocities, reducing species concentrations, and the like can be readily determined by those skilled in the art.

Preferably, the purge stream can comprise at leat a portion of absorber effluent. Most preferably, the purge can be effected by using the same portion of absorber effluent used for regeneration, by discontinuing the flow of $O_2$ to the regenerator during the purge period.

The invention will be further understood by the EXAMPLES which are set forth below.

EXAMPLE I - ABSORPTION: EFFECT OF TEMPERATURE

The effect of temperature on $H_2S$ breakthrough is studied using a laboratory catalyst holder/reactor made from type 304 stainless steel tubing 2" (inch) diameter (O.D.)×0.068" thick wall, 27" long overall. Calculated catalyst volume for 18" depth is 805 ml (milliliters), and the catalyst is supported by a 20 mesh stainless steel screen. Catalyst used is G72D Sulfur Removal Catalyst described above. The reactor is wrapped by six heaters (22 gauge nichrome wire) for preventing radial heat loss, and is insulated with fiberglass. The total flow rate for absorption is 10 l./min (liters/min) and for regeneration 5 l./min. The reactor is placed in a large Blue M ® oven, available from Blue M Electric Company, Blue Island, IL. All gas flow through the catalyst bed is downflow. Provisions for side draw of gas samples are available near the reactor axis each 1.5" of catalyst depth.

The effect of reaction temperatures on $H_2S$ breakthrough time during absorption is illustrated by introducing a feed gas having the following composition into the reactor inlet:

| | |
|---|---|
| $H_2S$ | 0.8 mol % |
| $SO_2$ | 0.4 mol % |
| CO | 1.0 mol % |
| $H_2O$ | 30.0 mol % |
| $N_2$ | 45.8 mol % |
| $H_2$ | 2.0 mol % |
| $CO_2$ | 20.0 mol % |

The feed gas is introduced at 850° F., at 1000° F., and at 1150° F. Breakthrough, defined for purposes of these runs as 50 ppm $H_2S$ in the absorber effluent, and $H_2S$ concentration in the effluent gas at equilibrium, are determined. Results are set forth in the following Table IA.

TABLE 1A

| Run | Temp. | Time (Hrs) for Breakthrough | Combined $SO_2$ and $H_2S$ Concentration (Dry Basis) at Equilibrium | Absorption Capacity wt % | mols absorbed/ mols sorbent |
|---|---|---|---|---|---|
| 1 | 850° F. | (Immed. $SO_2$ Breakthrough) | — | — | — |
| 2 | 1000° F. | 25.5 hrs | <10 ppm | 33% | 0.84 |
| 3 | 1150° F. | 27.5 hrs | <20 ppm | 36% | 0.92 |

The results indicate that higher temperatures favor increased absorption capacity as indicated by increased breakthrough times and that lower temperatures favor lower equilibrium concentrations of $H_2S$ in the absorber effluent streams. It is also noted that at 1000° F. and at 1150° F., $SO_2$ present in the inlet stream is substantially completely absorbed; while at 850° F., $SO_2$ appears immediately in the absorber effluent stream. Thus at temperatures at least about 1000° F. and higher hydrogenation of $SO_2$ to $H_2S$ is not required prior to absorption.

EXAMPLE II - ABSORPTION: EFFECT OF TEMPERATURE

The effect of temperature on $H_2S$ breakthrough is further investigated by the following runs using the apparatus described in EXAMPLE I and using an inlet stream having the following composition:

| | |
|---|---|
| $H_2S$ | 1.2 mol % |
| $H_2O$ | 29.5 mol % |
| H | 1.06 mol % |
| CO | 1.01 mol % |
| $CO_2$ | 20.39 mol % |
| $N_2$ | 46.83 mol % |

This inlet stream can be used to simulate the condition where $SO_2$ present in a Claus plant effluent stream is hydrogenated to $H_2S$ prior to absorption. Breakthrough time for various temperatures below 850° F. are determined and are shown in Table IIA below:

TABLE IIA

| Run | Temp. | Time (Hrs) for Breakthrough | Absorption wt % | Capacity mols/mol sorbent |
|---|---|---|---|---|
| 4 | 625° F. | 3 | 4% | 0.10 |
| 5 | 700° F. | 11 | 14% | 0.36 |
| 6 | 775° F. | 17 | 22% | 0.46 |

These results further confirm the dependence of absorption capacity and breakthrough on absorption temperature.

EXAMPLE III - ABSORPTION: EFFECT OF WATER

The effect of the presence of water on sulfur compound breakthrough is illustrated in part by EXAMPLE I above in which a feed gas stream containing 30.0% water is contacted with a ZnO absorbent and, at 1000° F. to 1150° F., the sulfur compounds in the effluent stream are reduced to 20 ppm or lower.

To further investigate the effect of water on sulfur compound breakthrough using a metal oxide absorbent, the apparatus of EXAMPLE I can be used with a zinc ferrite absorbent containing about 45% iron oxide and about 55% amorphous silica. About 15% of the 45% iron oxide is in the form of zinc ferrite. A feed gas having the following composition is introduced into the reactor inlet at 1000° F.:

| | |
|---|---|
| $H_2S$ | 1.2% |
| CO | 1% |
| $H_2$ | 2% |
| $CO_2^1$ | 20% (42%) |
| $H_2O^1$ | 22% (0%) |

-continued

| | |
|---|---|
| $N_2$.[1] | 53.8% |

[1]$CO_2$ content of inlet stream is increased from 20% to 42% when 22% $H_2O$ is eliminated from the feedstream.

After about 5½ hrs, water is eliminated from the feedstream. The results are shown in Table IIIA below.

TABLE IIIA

| Time (Hrs) | $H_2S$ Concentration in Reactor Effluent |
|---|---|
| 1 | 663 |
| 2.3 | 733 |
| 3.4 | 818 |
| 4.1 | 994 |
| 5.5[1] | 1682 |
| 5.7 | 9 |
| 7.1 | 9 |
| 8.6 | 9 |

[1]Water eliminated from feedstream.

The results indicate that the iron oxide (zinc ferrite) absorbent is sensitive to the presence of water in the feedstream as compared with the ZnO of EXAMPLE I. After water is removed from the feedstream, $H_2S$ in the effluent stream is reduced to 9 ppm. These results indicate that ZnO is less sensitive to water than is iron oxide (zinc ferrite).

EXAMPLE IV - REGENERATION

Regeneration is investigated using the apparatus described in EXAMPLE I by passing a dilute air stream in contact with the sulfided absorbent. The effect of temperature on regeneration is investigated. For a dilute air regeneration stream containing about 5 mol % oxygen having an inlet temperature of about 1000° F., the sulfur recovered as $SO_2$ in the regeneration effluent stream is only 0.75 mol %. However, when the inlet temperature is raised to 1150° F. after 5½ hrs, about 3 mol % of sulfur as $SO_2$ appears in the regeneration effluent stream. This higher regeneration temperature is considered preferred to overcome the high activation energy required for Reaction (8) above. During regeneration, the concentration of $SO_2$ in the regeneration effluent stream remains above about 3.5 mol% and the concentration of $O_2$ in the regeneration effluent stream remains about 0 mol %, indicating substantially complete consumption of $O_2$, for about 22 hrs. After about 22 hrs, when regeneration is about complete, $O_2$ starts to breakthrough and $SO_2$ content begins to decline in the regeneration effluent stream.

EXAMPLE V - EFFECT OF PURGE

Effluent tailgas from a Claus sulfur recovery plant having two catalytic reactors operated above the sulfur dewpoint and one Claus low temperature adsorption reactor on-stream at all times is provided to an absorber containing ZnO. A portion of absorber effluent is used as a diluent for $O_2$ to a regenerator containing ZnS. In a first run, upon completion of regeneration, the regenerator and absorber are interchanged in function. Upon interchanging the absorbers, an emissions level from the freshly regenerated catalyst, now functioning as an absorber, of about 350 ppm $SO_2$ is observed. $SO_2$ emissions decline to less than about 50 ppm in about two (2) hours. See FIG. 3. In a second run, upon completion of regeneration and prior to interchanging the absorber and the regenerator, $O_2$ flow into the regenerator is discontinued and the flow of absorber effluent is continued for a period of about two (2) hours. Upon interchanging the absorber and regenerator, $SO_2$ emissions from the absorber are initially less than about 50 ppm and continue at that low level. See FIG. 4. This example indicates that discontinuing $O_2$ flow and continuing absorber effluent, or other reducing gas flow, prior to interchanging an absorber and a regenerator eliminates a temporary increase in $SO_2$ emissions above a baseline level otherwise observed from the absorber effect interchanging the two reactors.

EXAMPLE VI - EFFECT OF REGENERATION GAS COMPOSITION ON PURGE

The effect of $SO_2$ levels during regeneration upon purge time requirements at the end of regeneration is investigated by regenerating sulfided absorbent using regeneration feedstreams having various $SO_2$ levels followed by purging with a reducing gas stream having 1.1% $H_2$ and 0.5% CO at a space velocity of about 1. The results are set forth in the following table:

| Run | $SO_2$ in Regeneration Feed | Purge Time (Hours) |
|---|---|---|
| 1 | 0% | 2.0 |
| 2 | 2.9% | 4.5 |
| 3 | 13.2% | >12 |

The results indicate that the $SO_2$ level in the regeneration feed greatly affects the purge time and that increased levels of $SO_2$ during regeneration increase the purge time requirements. The results indicate that the use of absorber effluent or other reducing gas having little or no $SO_2$ present at the inlet is advantageous in reducing purge time.

EXAMPLE VII - EFFECT OF REGENERATION TEMPERATURE ON PURGING/SUBSEQUENT ABSORPTION

Purging runs are made after regeneration at 900° F. and 1150° F. using absorber effluent as the purge gas. The test results show that by purging at 900° F., the increase in $SO_2$ emissions is not removed, whereas by purging at 1150° F., increased $SO_2$ emissions were not observed upon returning to absorption. Based upon these results, it is considered that purging should occur at temperatures from about 1000° F. to about 1200° F. consistent with the temperatures required for hydrogenation of other species in the presence of ZnO absorbent as set forth in Example I above.

EXAMPLE VIII - EFFECT OF $H_2$ ON $SO_2$ EMISSIONS

To investigate the effect of $H_2$ on $SO_2$ emissions, laden ZnO (ZnS) is regenerated at 1150° F. with a regeneration stream having the following inlet composition:

TABLE IXA

| | |
|---|---|
| $O_2$ | 5 mol % |
| $NH_3$ | 720 ppm |
| $CO_2$ | 85 mol % |
| $H_2O$ | 10 mol % |

After $SO_2$ emissions decreased to about 50 ppm, 1 mol % $H_2$ was added. $SO_2$ emissions immediately increased to about 450 ppm and then decreased with time. (Note: the $NH_3$ was present to simulate refinery gas in this run; however, the presence of $NH_3$ is not considered to affect the results from the addition of $H_2$ reported herein.)

These results indicate that reducing equivalents such as $H_2$ result in $SO_2$ emissions from a freshly regenerated absorbent. Thus, these results indicate that the effect of reducing gases during the purge period is to cause the production of and allow the removal of $SO_2$ from regenerated sulfated absorbent in the purge effluent stream prior to return to absorption. $SO_2$ removed during purge in regeneration effluent is sent to the Claus plant where sulfur is formed and removed from the process. In this way, $SO_2$ emissions from regenerated absorbent will not appear as emissions from the plant.

EXAMPLE IX - EFFECT OF HYDROGEN SULFIDE ON REDUCING $SO_2$ EMISSIONS

The effect of $H_2S$ on reducing $SO_2$ emissions is investigated by contacting freshly regenerated absorbent with a stream containing $H_2S$ but no $SO_2$. An $SO_2$ emissions peak of about 100 ppm is observed initially, diminishing to about 20 ppm after six (6) hours. These results indicate that $H_2S$ will be effective as a purge gas. It is noted that $H_2S$ will also result in absorbent loading. See Eq. (3).

EXAMPLE X - EFFECT OF METHANE ON REDUCING $SO_2$ EMISSIONS

The effect of methane on reducing $SO_2$ emissions is investigated by contacting absorbent, freshly regenerated with a stream comprising about 13% $SO_2$, with methane for six (6) hours. At the end of the six (6) hours, $SO_2$ emissions are about 2000 ppm. Upon switching to absorption, with a stream comprising 0.39 mol % $H_2S$, 0.16 mol % $SO_2$, 1.69 mol % $H_2$, and 0.26 mol % CO, $SO_2$ emissions of about 8000 ppm are observed which decrease to about 1000 ppm in about 7 hours. Mass spectrographic analysis of the effluent stream during purge with methane indicates that methane is not cracked to $H_2$ and CO at regeneration temperatures of about 1100° F. These results indicate that methane alone is relatively ineffective for purging to reduce $SO_2$ emissions under process conditions.

EXAMPLE XI - ANALYSIS OF SULFIDED ABSORBENT

Samples of fresh absorbent and regenerated absorbent, regeneration having been conducted at 1150° F. in the presence of oxygen and 13% $SO_2$ are analyzed by X-ray diffraction. The fresh absorbent is largely crystalline ZnO (zincite). The regenerated absorbent contains ZnO as the major component, with minor concentrations of zinc oxide sulfate $Zn_3O (SO_4)_2$, anhydrite $CaSO_4$, and gahnite, $ZnAl_2O_4$. These results indicate that sulfated compounds may be the cause of $SO_2$ emissions when reduced by contacting with a reducing gas stream.

Figure 2:
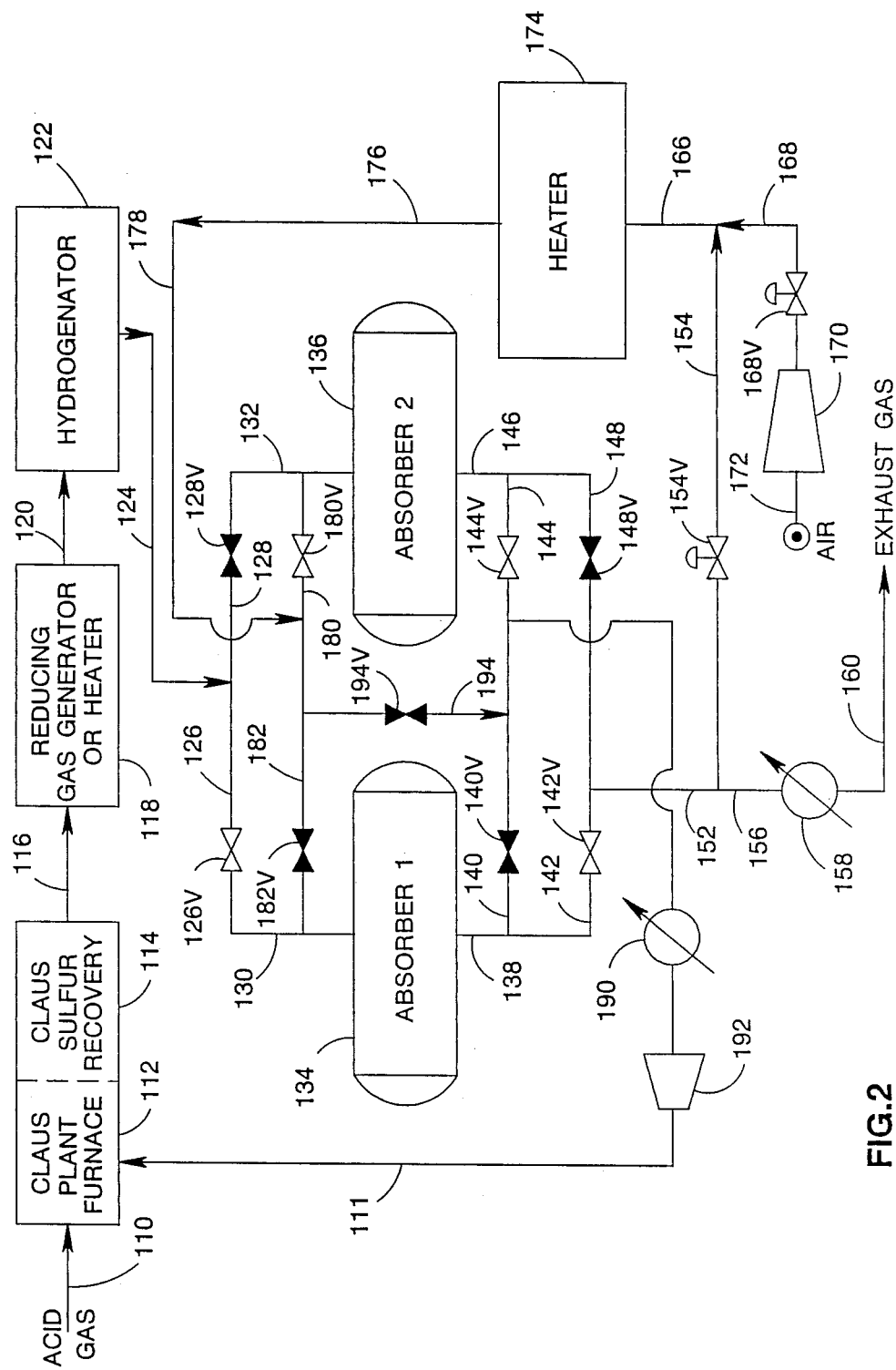
FIG. 2 shows schematically a second embodiment of the invented process.

The invention will be further described and further advantages and applications and equivalents will be apparent to those skilled in the art from the description of FIGS. 1 and 2.

Referring now to the drawings and specifically to FIG. 1, FIG. 1 represents an embodiment of the invented process in which absorption of $H_2S$ by the metal oxide absorbent can be carried out at a temperature above about 1000° F., preferably in the range of about 1000° F. to about 1200° F.

An acid gas stream 110 containing $H_2S$ is introduced into a Claus plant furnace 112 and combusted, in the presence of oxygen containing gas, for example, atmospheric air (source not shown), and/or $SO_2$ (provided, for example, via line 111), to produce elemental sulfur, $SO_2$, and water. The elemental sulfur is recovered and unconverted $H_2S$ and $SO_2$ are processed by Claus catalytic sulfur recovery 114, including at least one Claus catalytic reaction zone operated above the sulfur dewpoint and at least one low-temperature Claus adsorption reaction zone. Elemental sulfur is thus produced and removed, for example, by sulfur condensers (shown schematically by the arrow S). A Claus plant effluent stream is removed by line 116 containing sufficient reducing equivalents for reduction of sulfur containing compounds remaining therein to $H_2S$ in the hydrogenation zone or in the absorber zone.

The Claus plant effluent stream in line 116 can then be heated to an effective temperature as described herein. Preferably at least a portion of the heating requirements can be met by passing the Claus plant effluent stream 116 in direct heat exchange with the absorber effluent stream in line 156, for example, in recuperator 158, as indicated schematically by the line marked A. Following heating in recuperator 158, the heated Claus plant effluent stream can be provided by the lines marked B to heater 117 for further heating to above 1000° F., preferably in the range of about 1000°–1200° F. Alternatively, of course, the Claus plant effluent stream 116 can be provided directly (as indicated by the dashed line) and can be heated in heater 117 to a temperature in the range of about 1000° F. to about 1200° F. and introduced by lines 125, 126, valve 126V, and line 130 into first absorber 134. That other provision can be made for heating the Claus plant effluent stream in accordance with the invention will be clear to those skilled in this art.

First absorber 134 contains a ZnO absorbent effective to absorb $H_2S$ present in the inlet stream to produce a sulfided absorbent and to produce an absorber effluent stream 138 containing, for example, less than about 50 ppm $H_2S$. Simultaneously with absorption in first absorber 134, after heating to a temperature in the range of 1000° F. to 1200° F., $SO_2$ present in Claus effluent stream 116 can be hydrogenated to $H_2S$ utilizing reducing equivalents present in Claus effluent stream 116 and the resulting $H_2S$ can also be absorbed by the absorbent.

The absorber effluent stream 138 can be conducted by lines 142, valve 142V, lines 152, 156, heat recuperator 158, and line 160 for discharge, for example, to the atmosphere. The heat recuperator 158 provides at least a portion of the heat required for heating the Claus plant effluent stream as described above, or for producing high pressure steam. A portion of the absorber effluent stream can be withdrawn from line 152, by way of, for example, line 154, having valve 154V, for dilution of atmospheric air 172, via compressor 170 and line 168, having valve 168V, to produce a dilute air regeneration stream 166. During regeneration, valves 154V and 168V control the recycle rate to the Claus plant. In this way, recycle of regeneration effluent from the regenerator to the Claus plant can be reduced to a fraction of what otherwise is returned.

The regeneration stream 166 can be heated in heater 174 to regeneration temperatures and can be conducted by lines 176, 178, 180, valve 180V, and line 132 to second absorber 136 shown on regeneration. The heated regeneration stream 176 is thus passed in contact with sulfided absorbent in second absorber 136 to produce a regeneration effluent stream 146 having a reduced $O_2$ content and an increased $SO_2$ and/or sulfur content. Stream 146 is conducted by line 144, valve 144V, heat recuperator 190, compressor 192, and line 111 to the Claus plant furnace 112. Alternatively, the regeneration effluent stream can be introduced into a catalytic zone in the Claus plant 114 as indicated by dotted line 111'; however, operation should insure that no free or molecular oxygen is introduced thereby into the catalytic zone.

Absorption is continued in first absorber 134 and regeneration is continued in second absorber 136 until prior to or just before $H_2S$ breakthrough occurs in effluent stream 138 from first absorber 134. Preferably, the oxygen content and regeneration stream flow rate is established so that the regeneration time (plus purge and slack time) is equal to absorption time prior to $H_2S$ breakthrough. $H_2S$ breakthrough can be determined by monitoring the $H_2S$ content of first absorber effluent stream 138 until $H_2S$ content can exceed a predetermined limit which can be, for example, that suitable to meet emission requirements for discharge of stream 160.

Following $H_2S$ breakthrough, first absorber 134 can be placed on regeneration and second absorber 136 can be placed on absorption by closing valves 126V, 142V, 180V, and 144V in their respective lines 126, 142, 180, and 144; and by opening valves 128V, 182V, 140V, and 148V in the respective lines 128, 182, 140, and 148. Valve 194V in line 194 (which can be closed during normal operation) can be utilized to minimize pressure shock during valve switching.

Prior to interchanging the first absorber and the second absorber, purge of the second absorber zone can be effected by discontinuing $O_2$ flow to the second absorber, for example, by closing valve 168V, and by continuing flow of absorber effluent by line 154 and valve 154V to the second absorption zone 136 for a period effective to reduce $SO_2$ emissions, upon interchanging the absorbers, to a desired level.

Referring now to FIG. 2, FIG. 2 represents a second embodiment of the invention in which absorption can preferably be conducted, for example, in the range of about 600° F. to about 1000° F. and having a hydrogenation zone prior to $H_2S$ absorption. The reference numerals for FIG. 2 are the same as for FIG. 1 except as may be indicated below.

Claus plant effluent stream 116 can be heated in reducing gas generator or heater 118 and optionally reducing equivalents can be added to produce stream 120. Stream 116 can also be at least partially heated in indirect heat exchange with absorber effluent stream 156 in recuperator 158 as discussed above in reference to FIG. 1. Stream 120 can be provided to hydrogenator 122, in which $SO_2$ (and other sulfur compounds such as elemental sulfur, COS and $CS_2$) present in the Claus effluent stream 116 can be hydrogenated to $H_2S$ over an effective hydrogenation catalyst, preferably, for example, a cobalt, molybdenum hydrogenation catalyst. The hydrogenated stream 124 can then be introduced, for example, into first absorber 134 and $H_2S$ contained therein absorbed.

During regeneration of, for example, second absorber 136, regeneration and purging can be conducted as described above in reference to FIG. 1.

Other aspects of FIG. 2 and the operation thereof have been described above with reference to FIG. 1 and will not be repeated here.

It will be appreciated by those skilled in the sulfur recovery art that a Claus plant tailgas cleanup process is provided which is not sensitive to water content in the effluent stream and which is capable of continuously maintaining low levels of emission while reducing costs. Other embodiments and applications in the spirit of the invention and within the scope of the appended claims will be apparent to those skilled in the art from the description herein.

What is claimed is:

1. Process for the recovery of sulfur from a $H_2S$ containing gaseous stream comprising:
    (a) converting $H_2S$ to elemental sulfur by the Claus reaction in a Claus furnace and producing an effluent stream comprising both $H_2S$ and $SO_2$;
    (b) removing both $H_2S$ and $SO_2$ from the effluent stream by reaction in a first absorption zone with a sorbent containing ZnO, optionally after converting substantially all sulfur species to $H_2S$, thereby producing ZnS and an absorber effluent stream comprising $H_2$ and CO;
    (c) regenerating ZnS to ZnO in a second absorption zone by admixing $O_2$ with at least a portion of said absorber effluent and introducing the resulting stream containing from about 0.4 to about 3.5 mol. % $O_2$ into contact with ZnS in the second absorption zone, thereby producing regenerated ZnO and a regeneration effluent stream;
    (d) conditioning the regenerated ZnO from step (c) by introducing at least a portion of absorber effluent, without oxygen, into contact with the regenerated ZnO in the second absorption zone; and
    (e) interchanging the first absorption zone and the second absorption zone and continuing steps (b), (c), and (d); wherein
    step (d) is conducted for a period of time effective for reducing by at least 10% a temporary increase in emissions of $SO_2$ otherwise occurring from the second absorption zone after the first and second absorption zones are interchanged in the absence of step (d).

2. The Process of claim 1 wherein step (d) is effected by introducing the portion of the absorber effluent stream at a temperature above 1000° F.

3. The Process of claim 1 wherein step (d) is effected by introducing the portion of the absorber effluent stream at a temperature in the range of about 1000° to about 1200° F.

4. The Process of claim 1 wherein step (d) is continued for a period of time to substantially eliminate said temporary increase in $SO_2$ emissions.

5. The Process of claim 1, step (d), wherein the space velocity of the absorber effluent introduced into the second absorption zone during conditioning is about 1 lb mol/hr/cubic ft of absorbent, the period of time is in the range of about 0.5 to about 3 hrs. and wherein the reducing species are in the range of about 6.5 to about 1 mol % equivalents of $H_2$.

6. The Process of claim 5 wherein the space velocity of the absorber effluent introduced into the second absorption zone during conditioning is about 1 lb mol/hr/cubic/foot of absorbent, the period of time is in the range of about 1 to about 2 hrs. and wherein the reducing species are in the range of about 3.2 to about 1.6 mol % equivalents of $H_2$.

7. The Process of claim 1 wherein at least one Claus catalytic reaction zone is operated between step (a) and step (b) and has an effluent temperature in the range of about 550°–700° F.

8. The Process of claim 1 wherein the ZnO absorbent is sulfated in the presence of $SO_2$ and $O_2$ in step (c) to form zinc oxide sulfate, $ZnO_3(SO_4)_2$.

9. The Process of claim 1 wherein the ZnO absorbent comprises calcium oxide.

10. The Process of claim 1 wherein the ZnO absorbent comprises aluminum oxide, $Al_2O_3$.

11. The process of claim 1 wherein the gaseous effluent from steps (c) and (d) are returned as a recycle stream comprising $H_2S$ and/or $SO_2$ to the thermal reaction zone of the Claus furnace or to a downstream Claus catalytic reaction zone.

12. The process of claim 1 wherein said resulting stream in step (c) contains from about 1 to about 2.75 mol. % $O_2$.

* * * * *